United States Patent Office 3,417,110
Patented Dec. 17, 1968

3,417,110
PROCESS FOR THE PRODUCTION OF 3-(LOWER) ALKOXY - ESTRA - 1,3,5(10) - TRIEN-17β-YLOXY- (LOWER)ALKYL CARBOXYLIC ACID
Gerhard R. Wendt, Havertown, and Kurt W. Ledig, Philadelphia, Pa., assignors to American Home Products Corporation, New York, N.Y., a corporation of Delaware
No Drawing. Filed May 7, 1965, Ser. No. 454,195
1 Claim. (Cl. 260—397.1)

ABSTRACT OF THE DISCLOSURE

Lower alkyl carboxylic acid esters of 3-methoxyestradiol are prepared by reaction of a 3-alkyl ether of estradiol with potassium tertiary butoxide and a selected lower alkyl ester reactant, for example, an alkylbromoacetate or an unsaturated fatty acid ester. The products formed have estrogenic and antilipemic activity.

---

This invention relates to novel cyclopentanophenanthrene compounds. More particularly, this invention relates to new and useful compounds of the 3-lower alkyl ethers of estradiol having an oxy-lower alkyl carboxylic acid lower alkyl ester substituent in the 17-position as well as their method of preparation.

The novel compounds may be illustrated by the following formula:

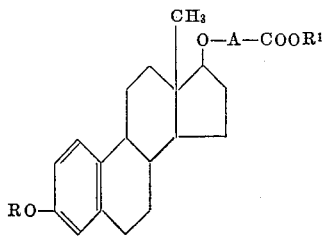

In the above structural formula, R and R¹ are intended to represent lower alkyls, preferably those having from 1 to 3 carbon atoms, with A standing for a lower alkylene group of 1 to 6 carbon atoms.

The compounds of the invention are prepared by reacting an estradiol-3-(lower)alkyl ether with potassium tertiary butoxide. The reaction product is then reacted with a lower alkylbromo or chloroacetate. In order to produce compounds where the lower alkylene radical A is other than methylene, the potassium salt is reacted with a lower alkyl ester of an unsaturated lower fatty acid, as for example, ethyl acrylate or methyl crotonate.

The reaction of the estradiol-3-alkyl ether with potassium tertiary butoxide and the acid ester compounds is carried out with benzene as the solvent under refluxing conditions for a number of hours until reaction is complete. Water is added to separate the organic layer and the solvent is then evaporated off leaving the desired product which is then purified, preferably by distillation.

The compounds of the invention when tested pharmacologically demonstrate estrogenic and antilipemic activity. The latter action is especially useful in lowering blood cholesterol levels. The compounds may be used orally or parenterally, generally with an excipient or a carrier, an effective dosage range falling in the range of about 1 to 5 milligrams per kilogram.

The following specific example illustrates one procedure for preparing the desired compounds, but this is not intended to limit the invention.

EXAMPLE

A suspension of 2.9 g. of estradiol-3-methyl ether, 50 ml. benzene and 1.6 g. of potassium tertiary butoxide is refluxed for 2 hours, after which is added 1.9 g. of ethyl bromoacetate and the reaction mixture is refluxed for 5 hours. Water is added, the organic layer is separated and washed with 2 N sulfuric acid. Evaporation of the solvent yields d-3-methoxy-estra-1,3,5(10)-trien-17β-yloxyacetic acid, ethyl ester. Distillation is carried out at $2 \times 10^{-3}$ mm., the desired product being obtained at 200° C. IR 5.7μ.

*Analysis.*—Calcd. for $C_{23}H_{32}O_4$: C, 74.16; H, 8.66. Found: C, 74.41; H, 8.52.

Falling within the scope of the invention, one may start with any 3-lower alkyl ether of estradiol, for example, the 3-ethyl or propyl ether of estradiol.

In place of ethyl bromoacetate, one may use ethyl chloroacetate. If the methyl or propyl ester is desired, the appropriate haloacetate is used.

Where it is desired to produce compounds of the higher fatty acid series, the same reaction is carried out but one replaces the ethyl bromoacetate with lower alkyl esters of unsaturated fatty acids. Thus, if one uses approximately the same amount of ethyl acrylate as ethyl bromoacetate, the product resulting is 3-(d-3-methoxy-estra-1,3,5(10)-trien-17β-yloxy)propionic acid, ethyl ester. If a higher fatty acid derivative is desired, one may use a crotonic acid ester, for example, methyl crotonate which will yield, under the conditions outlined above, 3-(d-3-methoxy-estra-1,3,5(10)-trien-17β-yloxy)butyric acid, methyl ester. Similarly, β-propyl acrylic acid, ethyl ester will yield 3-(d-3-methoxy-estra - 1,3,5(10) - trien - 17β-yloxy)caproic acid, ethyl ester.

We claim:
1. The process comprising, reacting a 3-(lower)alkyl ether of estradiol with potassium tertiary butoxide and an ester of the group consisting of a (lower)alkyl bromoacetate and a lower alkyl ester of an unsaturated (lower) fatty acid with a solvent under refluxing conditions and separating from the reaction mixture a lower alkyl ester of a 3-(lower)alkoxy - estra - 1,3,5(10) - trien-17β-yloxy- (lower)alkyl carboxylic acid.

References Cited
UNITED STATES PATENTS
3,081,315   3/1963   Bible _____ 260—397.1

ELBERT L. ROBERTS, *Primary Examiner.*

U.S. Cl. X.R.
167—74